US009042371B1

(12) United States Patent
Sylvain

(10) Patent No.: US 9,042,371 B1
(45) Date of Patent: May 26, 2015

(54) INTEGRATING TELEPHONE LINES WITH PACKET CONNECTIONS

(75) Inventor: Dany Sylvain, Gatineau (CA)

(73) Assignee: RPX CLEARINGHOUSE LLC, Dover, DE (US)

( * ) Notice: Subject to any disclaimer, the term of this patent is extended or adjusted under 35 U.S.C. 154(b) by 3718 days.

(21) Appl. No.: 10/410,949

(22) Filed: Apr. 10, 2003

(51) Int. Cl.
| H04L 12/66 | (2006.01) |
| H04M 3/56 | (2006.01) |
| H04M 3/46 | (2006.01) |
| H04M 3/54 | (2006.01) |
| H04L 29/06 | (2006.01) |

(52) U.S. Cl.
CPC . *H04M 3/56* (2013.01); *H04M 3/46* (2013.01); *H04M 3/54* (2013.01); *H04L 12/66* (2013.01); *H04L 29/06027* (2013.01)

(58) Field of Classification Search
USPC .............. 379/211.01–211.04; 370/352–356
See application file for complete search history.

(56) References Cited

U.S. PATENT DOCUMENTS

| 5,260,988 | A | 11/1993 | Schellinger et al. |
| 5,367,558 | A | 11/1994 | Gillig et al. |
| 5,563,938 | A | 10/1996 | Soshea et al. |
| 5,722,068 | A | 2/1998 | Bartle et al. |
| 5,905,792 | A * | 5/1999 | Miloslavsky ............ 379/265.11 |
| 5,909,650 | A | 6/1999 | Jonsson ..................... 455/461 |
| 5,911,120 | A | 6/1999 | Jarett et al. .................. 455/417 |
| 6,014,377 | A | 1/2000 | Gillespie ....................... 370/351 |
| 6,044,267 | A | 3/2000 | Foladare et al. ............. 455/426 |
| 6,070,054 | A | 5/2000 | Foladare et al. ............. 455/31.3 |
| 6,115,460 | A * | 9/2000 | Crowe et al. ............. 379/211.02 |
| 6,134,317 | A | 10/2000 | Shaffer et al. |
| 6,154,650 | A | 11/2000 | Abidi et al. |
| 6,216,000 | B1 | 4/2001 | Blumhardt |
| 6,226,515 | B1 | 5/2001 | Pauli et al. |
| 6,253,088 | B1 | 6/2001 | Wenk et al. |
| 6,304,565 | B1 * | 10/2001 | Ramamurthy ................ 370/352 |

(Continued)

FOREIGN PATENT DOCUMENTS

| WO | WO 99/52318 | 10/1999 | ............... H04Q 7/38 |
| WO | WO 02/19750 | 3/2002 | ............... H04Q 7/32 |

OTHER PUBLICATIONS

International Search Report for PCT/IB2004/001084 mailed Sep. 13, 2004.

(Continued)

*Primary Examiner* — Quynh Nguyen
(74) *Attorney, Agent, or Firm* — Withrow & Terranova, PLLC

(57) ABSTRACT

The present invention provides an effective technique for routing calls to one or more telephony terminals through a traditional telephony line as well as via a packet network. A terminal adapter is provided at a customer premise and supports multiple telephony terminals, which may be associated with the same or different directory numbers. For incoming calls, the telephony switch will determine whether to route the call over the traditional telephony line or through the packet network to the terminal adapter, which will facilitate the connection with one or more of the telephony terminals. The incoming calls can be routed to a specific telephony terminal based on incoming call indicia. The terminal adapter can initiate outgoing calls from the supported telephony terminals over the traditional telephony line or via the packet network to the telephony switch. Whether incoming or outgoing calls are routed through the telephony line or the packet network depends on system configuration and existing conditions.

42 Claims, 6 Drawing Sheets

(56) References Cited

U.S. PATENT DOCUMENTS

| | | |
|---|---|---|
| 6,327,470 B1 | 12/2001 | Ostling |
| 6,373,817 B1 | 4/2002 | Kung et al. |
| 6,374,110 B1 | 4/2002 | Parker et al. ............ 455/445 |
| 6,411,802 B1 | 6/2002 | Cardina et al. |
| 6,421,350 B1 | 7/2002 | Szurkowski et al. |
| 6,445,921 B1 | 9/2002 | Bell |
| 6,480,581 B1 * | 11/2002 | Wu et al. ............ 379/93.01 |
| 6,526,277 B1 | 2/2003 | Zicker et al. ............ 455/426 |
| 6,665,293 B2 * | 12/2003 | Thornton et al. ......... 370/352 |
| 6,694,143 B1 | 2/2004 | Beamish et al. .......... 455/456.1 |
| 6,708,028 B1 | 3/2004 | Byrne |
| 6,735,432 B1 | 5/2004 | Jarett et al. ............ 455/417 |
| 6,738,616 B1 | 5/2004 | Link, II et al. ............ 455/417 |
| 6,741,835 B2 | 5/2004 | Pulver |
| 6,766,175 B2 | 7/2004 | Uchiyama |
| 6,778,832 B1 | 8/2004 | Chow et al. |
| 6,853,718 B1 | 2/2005 | Bedingfield, Sr. et al. |
| 6,868,080 B1 | 3/2005 | Umansky et al. |
| 6,882,640 B1 * | 4/2005 | Berger et al. ............ 370/353 |
| 6,907,031 B1 | 6/2005 | Ehlinger et al. |
| 6,961,333 B2 * | 11/2005 | Norris et al. ............ 370/352 |
| 7,027,566 B2 * | 4/2006 | Bossemeyer et al. ...... 379/88.02 |
| 7,082,306 B2 | 7/2006 | Himmel et al. |
| 7,113,582 B1 | 9/2006 | Mangal |
| 7,212,520 B2 | 5/2007 | Luciano, III |
| 7,260,616 B1 * | 8/2007 | Cook ............ 709/218 |
| 2001/0003706 A1 | 6/2001 | Warburton et al. ........ 455/463 |
| 2002/0106028 A1 | 8/2002 | Thyssen |
| 2002/0163883 A1 | 11/2002 | Price |
| 2003/0039242 A1 | 2/2003 | Moore, Jr. ............ 370/354 |
| 2003/0069018 A1 | 4/2003 | Matta et al. |
| 2003/0076816 A1 | 4/2003 | Naranjo et al. |
| 2003/0148758 A1 * | 8/2003 | McMullin ............ 455/415 |
| 2003/0161453 A1 | 8/2003 | Veschi |
| 2004/0052242 A1 | 3/2004 | Laturell |
| 2004/0132485 A1 | 7/2004 | Charney et al. |
| 2005/0207395 A1 | 9/2005 | Mohammed |

OTHER PUBLICATIONS

European Examination Report for European European Patent Application No. 04726232.4, issued Jan. 25, 2006, 5 pages.

Non-Final Office Action for U.S Appl. No. 10/409,280, mailed Aug. 12, 2005, 10 pages.

Final Office Action for U.S. Appl. No. 10/409,280, mailed Mar. 15, 2006, 11 pages.

Interview Summary for U.S. Appl. No. 10/409,280, mailed Sep. 29, 2006, 2 pages.

Examiner's Answer for U.S. Appl. No. 10/409,280, mailed Oct. 3, 2006, 18 pages.

Examiner's Answer for U.S. Appl. No. 10/409,280, mailed Nov. 1, 2006, 18 pages.

Non-Final Office Action for U.S. Appl. No. 10/409,290, mailed Jul. 5, 2005, 6 pages.

Non-Final Office Action for U.S. Appl. No. 10/409,290, mailed Dec. 30, 2005, 6 pages.

Final Office Action for U.S. Appl. No. 10/409,290, mailed Jun. 15, 2006, 6 pages.

Non-Final Office Action for U.S. Appl. No. 10/409,290, mailed Apr. 24, 2007, 7 pages.

* cited by examiner

INTEGRATING TELEPHONE LINES WITH PACKET CONNECTIONS

CROSS-REFERENCE TO RELATED APPLICATIONS

The present invention is related to concurrently filed U.S. application Ser. No. 10/411,159, entitled INTEGRATING TELEPHONE LINES WITH PACKET CONNECTIONS WITH A TERMINAL ADAPTER, the disclosure of which is incorporated herein by reference in its entirety.

FIELD OF THE INVENTION

The present invention relates to selectively providing telephony communications via telephony lines or packet networks in a dynamic fashion.

BACKGROUND OF THE INVENTION

Telephony communications have traditionally been provided by the public switched telephone network (PSTN), which remains dominant in providing telephony services using circuit-switched connections. The PSTN continues to provide the highest quality of service levels for telephony communications and extends to a vast majority of the population. With the ever-increasing availability and quality associated with voice-over-packet technologies, there is a movement towards providing telephony communications in association with various types of media services via packet-switched networks.

An increasing number of households and businesses have both PSTN connections through telephony lines, such as plain old telephone system (POTS) lines, as well as broadband access over packet-switched networks to provide access to the Internet, file transfer, streaming media, and the like. Although the PSTN provides a higher quality of service, broadband access quality is continuing to increase and has reached a level at which voice communications are of an acceptable quality. Accordingly, PSTN and broadband subscribers can theoretically facilitate telephony communications via the telephony line or broadband access; however, there is no way to effectively integrate telephony communications over both the telephony line and via broadband access in an efficient and user-friendly manner.

For example, there is no way to associate the same directory number with multiple telephony devices and yet provide for calls to be directed over either the telephony line or via broadband access. Additionally, even though there are two paths through which to connect to a subscriber, there is no way to use both lines at the same time in association with the common directory number. Further, there is no way to automatically allow a subscriber to select the use of either a telephony line or broadband access to receive or initiate calls based on the desired quality level or other priority indicia. There is also no way to allow multiple calls to be simultaneously connected in association with a common directory number. In short, existing technology does not allow an effective integration between a telephony line and corresponding broadband access in an efficient manner.

SUMMARY OF THE INVENTION

The present invention provides an effective technique for routing calls to one or more telephony terminals through a traditional telephony line as well as via a packet network. A terminal adapter is provided at a customer premise and supports multiple telephony terminals, which may be associated with the same or different directory numbers. For incoming calls, the telephony switch will determine whether to route the call over the traditional telephony line or through the packet network to the terminal adapter, which will facilitate the connection with one or more of the telephony terminals. The incoming calls can be routed to a specific telephony terminal based on incoming call indicia. The terminal adapter can initiate outgoing calls from the supported telephony terminals over the traditional telephony line or via the packet network to the telephony switch. Whether incoming or outgoing calls are routed through the telephony line or the packet network depends on system configuration and existing conditions.

When an emphasis is placed on high quality communications, the incoming or outgoing calls are provided via the telephony line, assuming the telephony line is available. When the telephony line is busy supporting an existing call, subsequent incoming or outgoing calls may be routed through the packet network. Preferably, a service node is provided in association with the telephony switch to assist in controlling the operation of the switch and effect forwarding of incoming calls that are directed to the terminal adapter through the packet network. In addition to routing calls through the packet network based on whether or not the telephony line is available, many other criteria can be used to control the routing of the incoming and outgoing calls. The calls may be routed based on a directory number associated with the incoming call or the calling party, and for an outgoing call, the telephony terminal at which the call originates. Those skilled in the art will recognize various rules and affiliated conditions for determining when and how calls should be routed such that they are established over the telephony line or via the packet network.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention allows telephony communications with one or more telephony terminals associated with a subscriber to be facilitated using either a traditional telephony line, such as a plain old telephone system (POTS) line, or via a broadband access connection. Whether the telephony line or the broadband access connection is used depends on the availability of these connections or routing rules provided by the service provider or the subscriber. Notably, the determination to route the calls via the telephony line or the broadband access connection does not depend on a directory number. Further, the subscriber's telephony terminals may be associated with the same directory number and incoming calls are simply directed to the subscriber's telephony terminal through either the telephony line or via the broadband access connection based on connection availability, desired quality, or any other desired indicia. Further details are provided after an overview of an exemplary communication environment according to the present invention.

Figure 1:
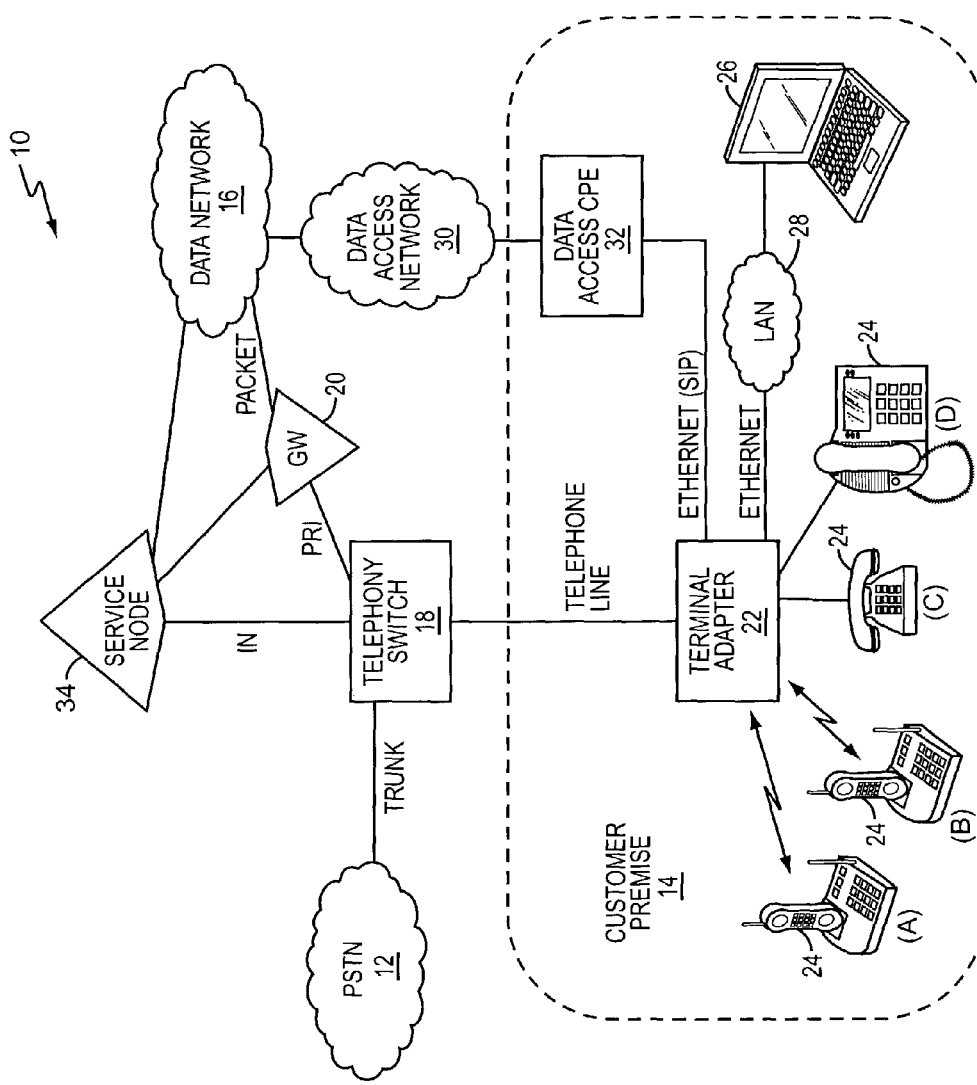
FIG. 1 is a block representation of a communication environment according to one embodiment of the present invention.

With reference to FIG. 1, a communication environment 10 is shown wherein a pubic switched telephone network (PSTN) 12 supports telephony communications to a customer premise 14. In addition to the traditional telephony services, a data network 16 is also provided such that broadband access via a packet-switched network is also available to the customer premise 14. Central to the communication environment 10 is a telephony switch 18, which is effectively coupled to the PSTN 12 via traditional telephony trunks, as well as to the data network 16 via an appropriate gateway 20 that is capable of converting between circuit-switched communications supported by the telephony switch 18 and packet-switched communications with the data network 16. An exemplary interface between the telephony switch 18 and the gateway 20 is a primary rate interface (PRI).

Central to the customer premise 14 is a terminal adapter 22, which is coupled to the telephony switch 18 via a telephony line or like telephony interface, as well as to one or more telephony terminals 24 via wireless, wired, or packet-switched interfaces. As illustrated, telephony terminals 24A and 24B are cordless telephones facilitating a local wireless interface with the terminal adapter 22, and as such, operate as traditional cordless telephones. Telephony terminal 24C is a traditional telephony-based telephone requiring a wired interface, while telephony terminal 24D is a packet-switched telephone requiring a packet-based interface. The terminal adapter 22 is illustrated as being capable of supporting multiple types of interfaces, but such functionality is not required. The terminal adapter 22 is represented in this fashion to show that it may support multiple telephony terminals 24, as well as support these telephony terminals 24 using different types of interfaces. The terminal adapter 22 may also act as an interface for other packet devices, such as a personal computer (PC) 26, directly or via a local area network (LAN) 28.

In addition to coupling to the telephony switch 18 via a telephony line, the terminal adapter 22 provides access to the data network 16 through a data access network 30 via data access customer premise equipment (CPE) 32. The data access CPE 32 may be a cable modem, DSL modem, ISDN modem, or like communication terminal that provides access to the data network 16 via the corresponding cable network, DSL network, or ISDN connection that forms the data access network 30. Those skilled in the art will recognize other ways to facilitate broadband access to the data network 16 via the terminal adapter 22.

For the present invention, the telephony terminals 24 may have the same or different directory numbers, and incoming calls from the PSTN 12 may be directed through the telephony switch 18 directly to the terminal adapter 22 over the telephony line, or indirectly to the terminal adapter 22 via the gateway 20, data network 16, data access network 30, and data access CPE 32. Similarly, outgoing calls may be supported directly via the telephony switch 18 over the telephony line, or indirectly via the data access CPE 32, data access network 30, data network 16, gateway 20, and telephony switch 18. The telephony switch 18 cooperates with a service node 34 to determine how to route incoming calls to one or more of the telephony terminals 24. Further, the service node 34 will assist in routing outgoing calls directed through the data network 16 to the telephony switch 18 via the gateway 20 and on to their destinations via the PSTN 12. The telephony switch 18 can be based on time division multiplexed (TDM) or packet technology. The telephony switch 18 can be a public network switch or a Public Branch Exchange (PBX). When the telephony switch 18 is based on packet technology, those skilled in the art will recognize that the gateway 20 is no longer needed to perform TDM-to-packet conversion, as the internal voice format for the telephony switch 18 is already in packet format.

Incoming calls directed to one of the telephony terminals 24 will generally be received by the telephony switch 18, which will check with the service node 34 for special instructions on how to route the incoming calls. The service node 34 will cooperate with the telephony switch 18 to control how the incoming calls are routed to the telephony terminals 24. For example, the telephony switch 18 may automatically route incoming calls to the terminal adapter 22 via the telephony line when the telephony line is not busy. Otherwise, the telephony switch 18 will query the service node 34 as to how to process the incoming call. If the telephony line is busy, for example, the service node 34 can instruct the telephony switch 18 to route the call to the gateway 20, wherein the gateway 20 will receive instructions from the service node 34 to route the call to the terminal adapter 22 via the data network 16. At that point, the terminal adapter 22 will facilitate a connection with the appropriate telephony terminal 24. Notably, the service node 34 and telephony switch 18 can cooperate to allow the telephony terminals 24 to share a common directory number, as well as support multiple directory numbers that are either individually assigned or commonly shared amongst the telephony terminals 24. Thus, the service node 34 operates to assist the telephony switch 18 in routing incoming calls.

For outgoing calls, the telephony switch 18 will receive calls over the telephony line from the terminal adapter 22 and will route the calls in traditional fashion. When the terminal adapter 22 directs calls in an indirect fashion via the data network 16 to the telephony switch 18, the service node 34 will cooperate with the telephony switch 18 and perhaps the gateway 20 to insure the call is property routed over the PSTN 12 with the appropriate caller identification information, along with any other information necessary for call routing. Thus, the service node 34 is instrumental in providing call routing from a network level.

In the customer premise 14, the terminal adapter 22 operates to determine when to route outgoing calls via the telephony line to the telephony switch 18 or via the broadband access provided by the data network 16, in addition to facilitating the necessary connections and signal processing to allow any of the telephony terminals 24 to communicate over either the telephony line or via the broadband access. Thus, the terminal adapter 22 interfaces directly with the telephony switch 18 as well as the data access CPE 32, preferably via an Ethernet connection, and takes the necessary measures to allow each of the telephony terminals 24 to communicate through either the telephony line or via the data access CPE 32. Further, the terminal adapter 22 may be configured to support various other media and data functions, or devices such as the PC 26. When non-telephony-type data communications are being provided, the terminal adapter 22 may be configured to control the rate at which data is transferred to and from the PC 26, and thus through the data access CPE 32, to make sure sufficient bandwidth is available for simultaneous telephony communications through the data access CPE 32 from the telephony terminals 24. Thus, the terminal adapter 22 can systematically inject data packets from the PC 26 into the packet stream supporting telephony communications at a rate that will not affect the quality of service associated with the call.

In certain embodiments, the service node 34 and the terminal adapter 22 will attempt to maximize use of the telephony line for calls and facilitate calls via the data network 16 when the telephony line is busy or when less important or lower priority calls are being made, in an effort to keep the telephony line free for higher priority calls or users. In general, such control for incoming calls is provided by the service node 34 and for outgoing calls by the terminal adapter 22. Notably, the terminal adapter 22 and the service node 34 may communicate with each other to provide a cooperative call control environment.

Figure 2A:
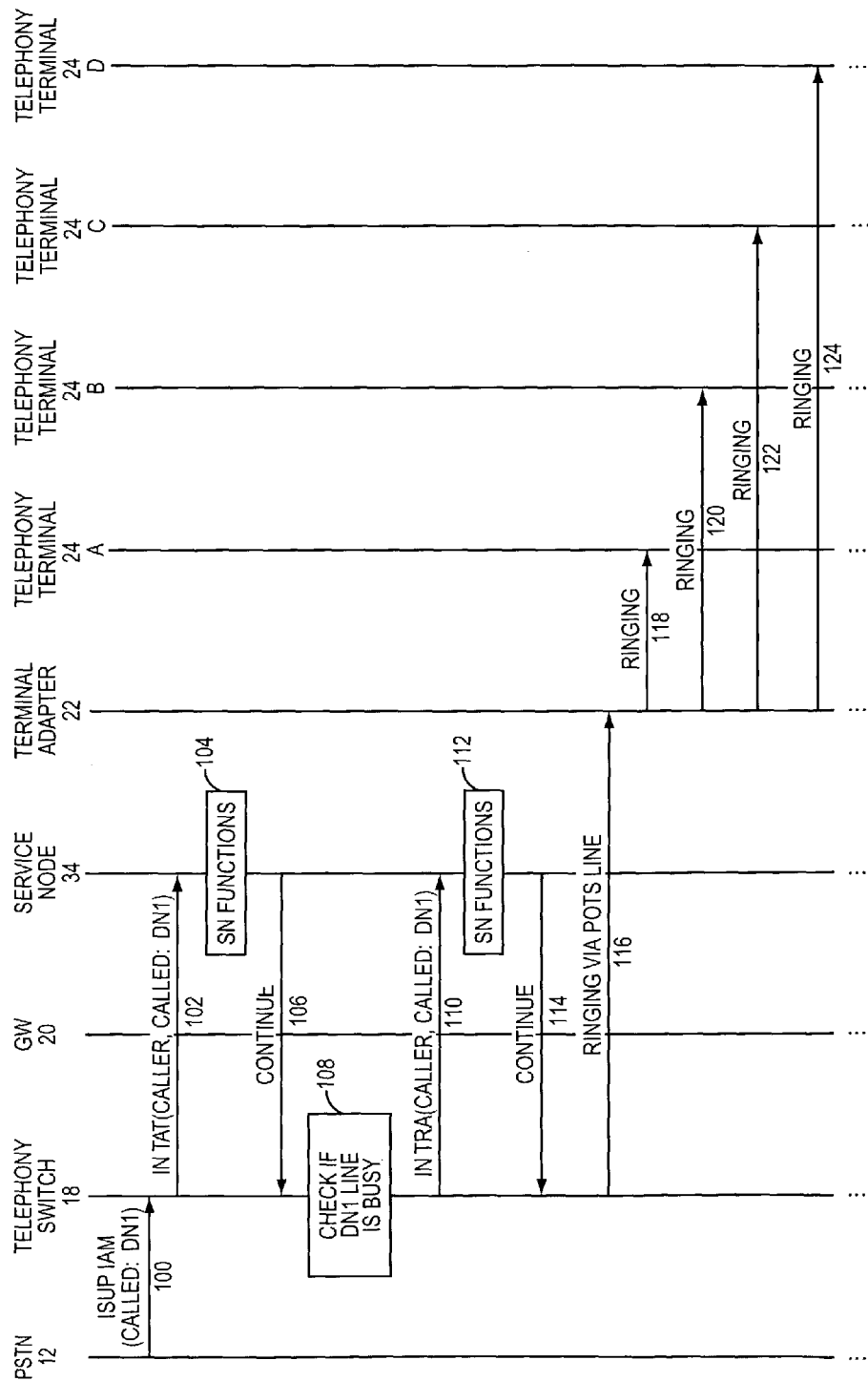
FIGS. 2A-2C illustrate a communication flow diagram outlining an exemplary process for handling multiple incoming calls directed to a common directory number according to one embodiment of the present invention.
Figure 2B:
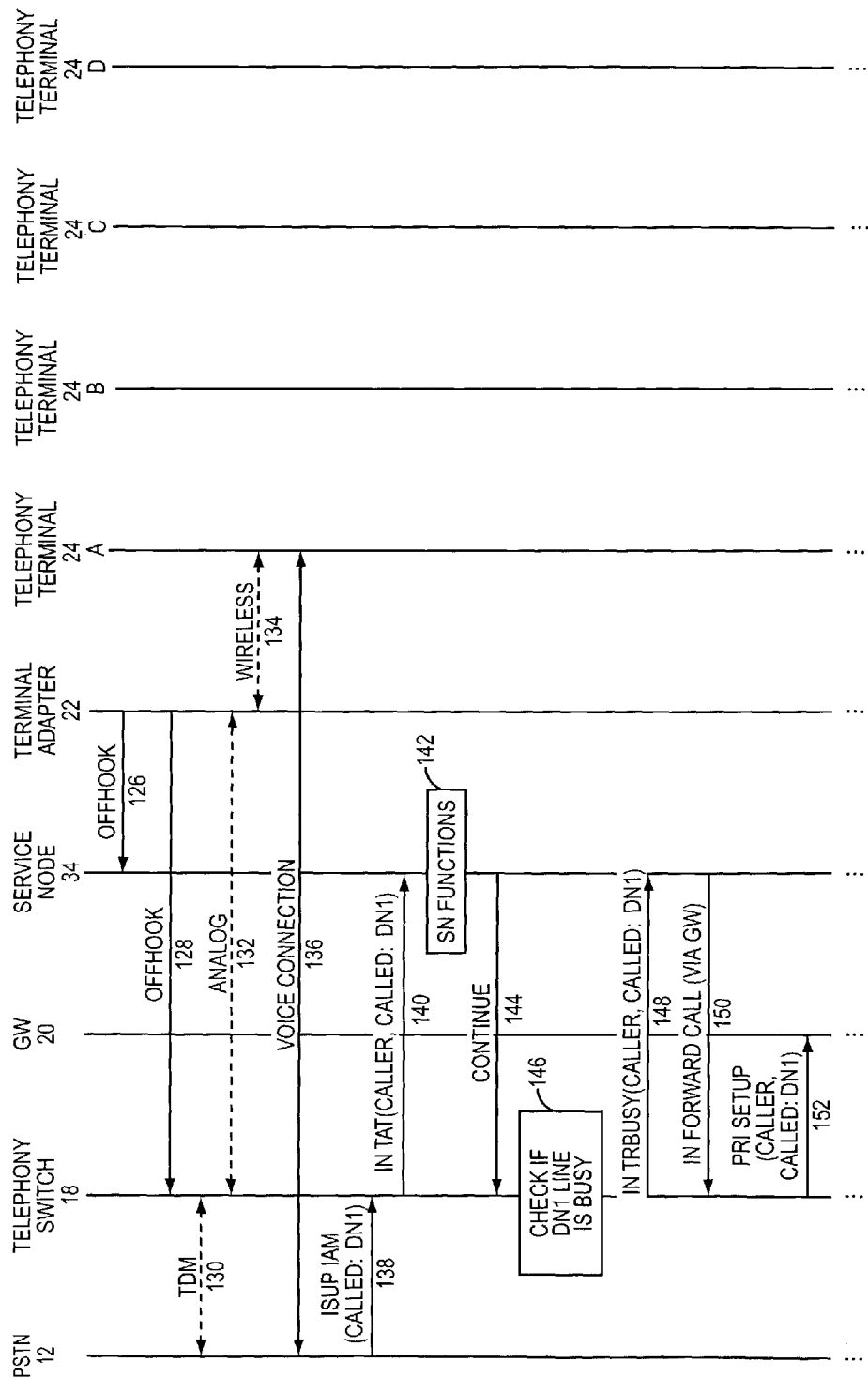
Figure 2C:
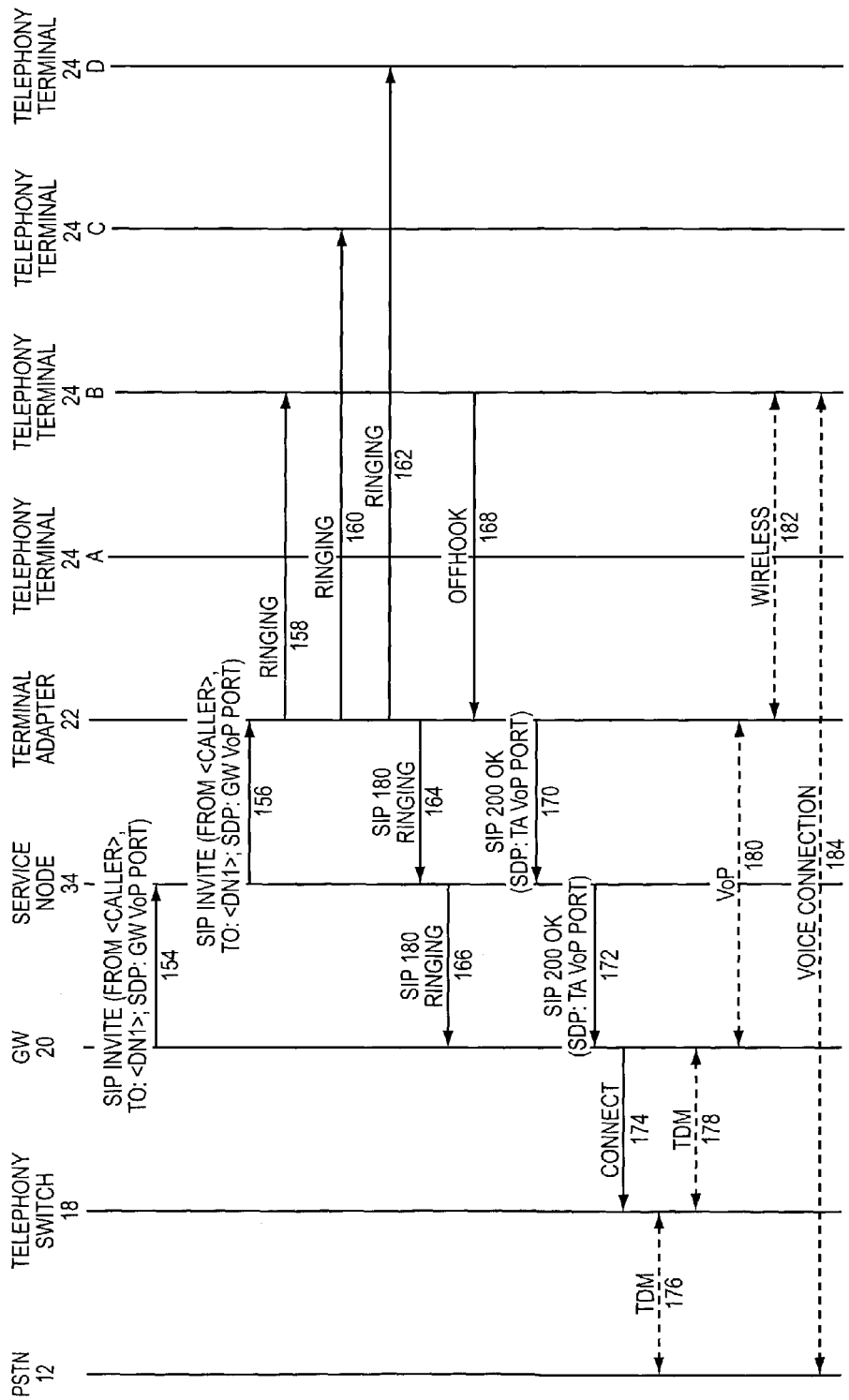

Turning now to FIGS. 2A-2C, a communication flow is provided according to an exemplary embodiment. As illustrated, an incoming call from the PSTN 12 is directed to the customer premise 14, wherein the telephony terminals 24 are associated with a common directory number, DN1. Notably, the service node 34 is configured to direct calls to the terminal adapter 22 over the telephony line when the telephony line is not busy. When the telephony line is busy, the service node 34 will take the necessary measures to have the call routed through the data network 16 to the terminal adapter 22. Regardless of how the call is routed, the terminal adapter 22 will recognize the incoming call via the telephony line or through the data network 16, and ring all of the telephony terminals 24 that are not in use. If a telephony terminal 24 is in use, the terminal adapter 22 will not ring that specific telephony terminal 24 for a subsequent incoming call. The following provides a high-level overview of the basic communications instructions to implement the above functionality.

Initially, an incoming call is routed through the PSTN 12 to the telephony switch 18, wherein the incoming call is directed to a directory number associated with the telephony line, which is terminated at the terminal adapter 22. Accordingly, an Integrated Services User Protocol (ISUP) Initial Address Message (IAM) identifying the directory number for the called party is sent to the telephony switch 18 (step 100). Optionally, the telephony switch 18 is provisioned to initiate contact with the service node 34 for calls directed to the given directory number. As such, an Intelligent Network (IN) Termination Attempt Trigger (TAT) is sent to the service node 34 and will identify the caller and the called party by their respective directory numbers (step 102). The service node 34 will process the information and provide any necessary functions for such an event (step 104). For example, the service node 34 may log the call, determine if any special routing instructions have been provided based on the caller or the called party, or any other desired function established by the service provider or the subscriber. Next, the service node 34 will send a Continue message back to the telephony switch 18 (step 106) to continue processing the incoming call.

The telephony switch 18 will then check if the telephony line associated with directory number DN1 is busy (step 108). Assume at this point that there are no ongoing calls via the telephony line or otherwise through the data network 16 to any of the telephony terminals 24(A-D). As such, an IN Termination Resource Available trigger (TRA) message is sent back to the service node 34 indicating that the telephony line is not busy (step 110). The service node 34 will then implement the necessary functions based on that trigger (step 112). In this case, the service node 34 is configured to instruct the telephony switch 18 to terminate the incoming call via the telephony line, since the telephony line is not busy. As such, the service node 34 will send a Continue message back to the telephony switch 18 (step 114). The telephony switch 18 will then take the necessary steps to send a Ringing signal to the terminal adapter 22 via the telephony line (step 116). The terminal adapter 22 will detect the Ringing signal from the telephony switch 18 via the telephony line, and take the necessary steps to ring each of the telephony terminals 24(A-D) (steps 118-124). At this point, each of the telephony terminals 24(A-D) is ringing.

Assume that telephony terminal 24A is answered, and thus goes off hook, which triggers an Offhook message to be sent to the terminal adapter 22 (step 126). The terminal adapter 22 will recognize this and take the necessary steps to go off hook at the telephony line, which is recognized by the telephony switch 18 (step 128). The telephony switch 18 will then establish a TDM connection via the PSTN 12 to connect to the caller (step 130), as well as establish an analog connection via the telephony line with the terminal adapter 22 (step 132). The terminal adapter 22 will establish a wireless connection with the telephony terminal 24A (step 134). Notably, the connection between the terminal adapter 22 and the telephony terminal 24 can be wired or wireless, and may use analog, digital, or packet-based communications. The terminal adapter 22 will include the necessary signal processing circuitry to provide any necessary signal translations if communication formats are changed. At this point, a voice connection is established between the caller and telephony terminal 24A through the PSTN 12, telephony switch 18, and terminal adapter 22 (step 136).

Next, assume that the first call, which was answered by telephony terminal 24A, is in progress when a second call to the common directory number DN1 comes into the telephony switch 18 via the PSTN 12 by way of an ISUP IAM (step 138). Again, the telephony switch 18 may optionally alert the service node 34 of the incoming call to the directory number DN1 by sending an IN TAT message to the service node 34 (step 140). The service node 34 will function accordingly (step 142) and send a Continue message back to the telephony switch 18 (step 144). The telephony switch 18 will then check to see if the telephony line associated with directory number DN1 is busy (step 146). Since the first call is in progress over the telephony line, the telephony switch 18 will determine that the telephony line is busy, and send an IN Terminating Resource Busy Trigger (TRBUSY) to the service node 34 identifying the caller and the called party, preferably by their directory numbers (step 148).

The service node 34 will recognize that the directory number is associated with a configuration capable of receiving calls via the data network 16, which is coupled to the telephony switch 18 via the gateway 20. As such, the service node 34 will send an IN Forward Call message to the telephony switch 18 instructing the telephony switch 18 to forward the incoming call to the terminal adapter 22 via the gateway 20 (step 150). The telephony switch 18 will respond by sending a PRI Setup message to the gateway 20 identifying the caller and the address or directory number with which the terminal adapter 22 is associated in the data network 16 (step 152). The gateway 20 will attempt to initiate a communication session with the terminal adapter 22. In one embodiment, the Session Initiation Protocol (SIP) is used, wherein a SIP Invite message is sent directly to the service node 34 from the gateway 20 (step 154). The SIP Invite message will identify the address and port number for the telephony terminal 24 that is associated with the directory number DN1, or other indicia identifying a subscriber or customer premise 14. The SIP Invite message will also provide address and port information to which the terminal adapter 22 should send packets to the gateway 20 during a voice-over-packet (VoP) session.

The service node 34 will send a corresponding SIP Invite message to the terminal adapter 22 via the data network 16, data access 30, and data access CPE 32 (step 156). At this point, the terminal adapter 22 has the address and port information for sending packets to the gateway 20. The terminal adapter 22 will receive the SIP Invite message, recognize that an incoming call is being established via the data network 16, and take the necessary steps to ring the telephony terminals 24(B, C, and D) that are available (steps 158-162). Notably, telephony terminal 24A is not rung, because the first call is still in progress. Meanwhile, the terminal adapter 22 will respond to the SIP Invite by sending a SIP 180 Ringing message to the service node 34 to indicate that the telephony terminal or terminals 24 are ringing (step 164). The service node 34 will forward the SIP 180 Ringing message to the gateway 20 (step 166), which will wait for a SIP 200 OK message indicating that one of the telephony terminals 24 has been answered.

Assume that telephony terminal 24B is answered and goes off hook. The terminal adapter 22 will recognize that the telephony terminal 24B has gone off hook (step 168), and will generate a SIP 200 OK message identifying the voice-over-packet (VoP) port to which telephony packets should be directed for the terminal adapter 22 (step 170). The service node 34 will send a similar SIP 200 OK message to the gateway 20 (step 172). At this point, the gateway 20 has the address and port information for sending packets to the terminal adapter 22, and the terminal adapter 22 has the address and port information for sending packets to the gateway 20. Once the SIP 200 OK message is received, the gateway 20 will send a Connect message to the telephony switch 18 instructing the telephony switch 18 to take the necessary steps to connect the incoming call from the PSTN 12 to the gateway 20 (step 174). Accordingly, a TDM connection will be established between one or more switches in the PSTN 12 and the telephony switch 18 (step 176), as well as between the telephony switch 18 and the gateway 20 (step 178). Bi-directional VoP sessions are established between the gateway 20 and the terminal adapter 22 (step 180) based on the address and port information provided above. Finally, the terminal adapter 22 will establish a wireless connection with telephony terminal 24B (step 182). Again, the connection between the terminal adapter 22 and the telephony terminal 24 may be implemented with an analog, digital, wireless or packet-based connection. With these connections, a voice connection is effectively established between the PSTN 12 and the telephony terminal 24B, wherein the PSTN 12 provides the necessary connection to the calling party (step 184).

Figure 3:
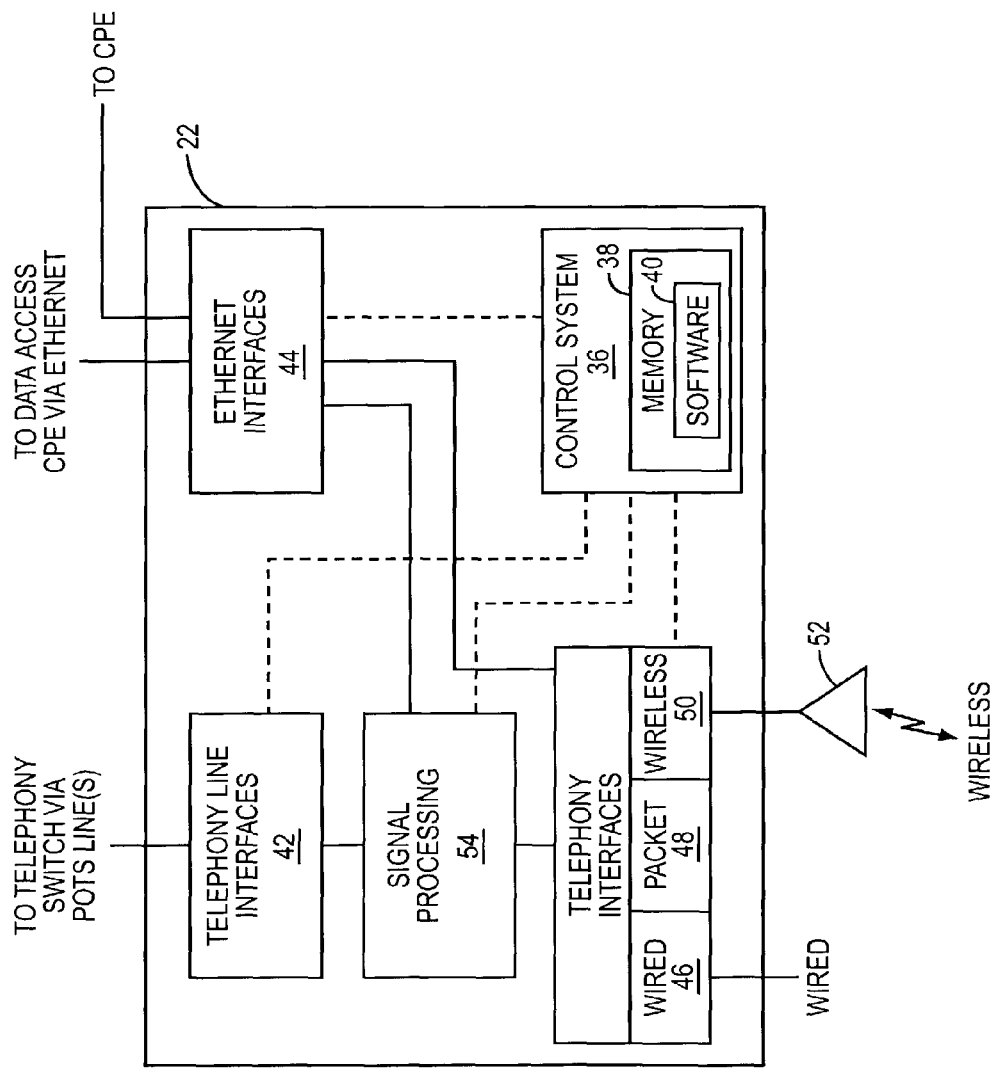
FIG. 3 is a block representation of a terminal adapter according to one embodiment of the present invention.

Turning now to FIG. 3, a block representation of a terminal adapter 22 is provided. The terminal adapter 22 is centered around a control system 36 having sufficient memory 38 for storing software 40 and the necessary data to function as described above. The control system 36 will cooperate with telephony line interfaces 42, Ethernet interfaces 44, and one or more telephony interfaces, such as a wired telephony interface 46, a packet interface 48, or a wireless telephony interface 50, which is associated with the necessary antenna or antennas 52. Incorporated within or closely associated with the control system 36, a signal processing function 54 operates to convert, as necessary, analog communications over the telephony line to any format necessary for the telephony interfaces 46, 48, 50, as well as converting packet communications provided at the Ethernet interface 44 to any format for the telephony interfaces 46, 48, 50. Notably, signal processing may not be necessary, for example when communications over the telephony line are directed to the wired or wireless telephony interfaces 46, 50. However, if the packet telephony interface 48 is used, the conversion back and forth between VoP is necessary. Similarly, VoP to analog or like circuit-switched conversions must be provided by the signal processing function 54 for conversions between the Ethernet interface 44 and the wired or wireless telephony interfaces 46, 50. If the packet telephony interface 48 is used, no such conversion may be necessary.

As illustrated, the Ethernet interface 44 may also connect to customer premise equipment such as telephone 24D or the PC 26 directly or indirectly via the LAN 28. For outgoing packet communications from any of the telephony interfaces 46, 48, 50, the control system 36 may effectively control the rate at which data packets from the PC 26 are injected into the outgoing stream of voice packets originating at the telephony interfaces 46, 48, 50. Preferably, the control system 36 will monitor indicia indicative of the quality of the VoP connection, or the rate at which packets can be transmitted toward the data network 16 to ensure the transmission of packets does not degrade the VoP session below a defined threshold.

In addition to providing any necessary conversions between packet and non-packet communication formats, the terminal adapter 22, typically via the control system 36, will monitor the status of the telephony line and determine how to route outgoing calls from any of the telephony terminals 24 according to a defined rule set. In a simplistic configuration, outgoing calls will be initiated and established via the telephony line in traditional PSTN fashion, unless the telephony line is busy, wherein the calls will be initiated and established via the Ethernet interface 44. In another configuration, the terminal adapter 22 may prioritize select telephony terminals 24 over others, such that when telephony terminal 24A is used, the default connection is via the telephony line, if the telephony line is not busy. For telephony terminal 24B, the default connection will always be via the Ethernet interface 44. Thus, users of telephony terminal 24B are not provided access to the telephony line, while users of the telephony terminal 24A are.

For incoming calls, the terminal adapter 22 may be configured to ring all of the non-busy telephony terminals 24 for incoming calls via the telephony line or the Ethernet interface 44 and facilitate a connection to the first telephony terminal 24 to be answered. Other rules may have the terminal adapter 22 consecutively ring the different telephony terminals 24 in a prioritized fashion, or determine which of the telephony terminals 24 will ring based on predefined rules. For example, the type of ring signal coming in over the telephony line may dictate which telephony terminal 24 is used, such as when teenagers have a second number, which causes a unique ring signal indicative of a telephone call to their separate directory number. In this case, the terminal adapter 22 will recognize the ring over the telephony line or receive information via the Ethernet interface 44 as the case may be, and only ring the telephony terminal 24 associated with the teenager. In other configurations, the terminal adapter 22 may monitor the caller via caller ID or messaging provided via the Ethernet interface 44, and determine which telephony terminal 24 to ring based on the identification of the caller. Those skilled in the art will recognize multiple ways for the terminal adapter 22 to control outgoing and incoming calls based on the teachings herein.

Figure 4:
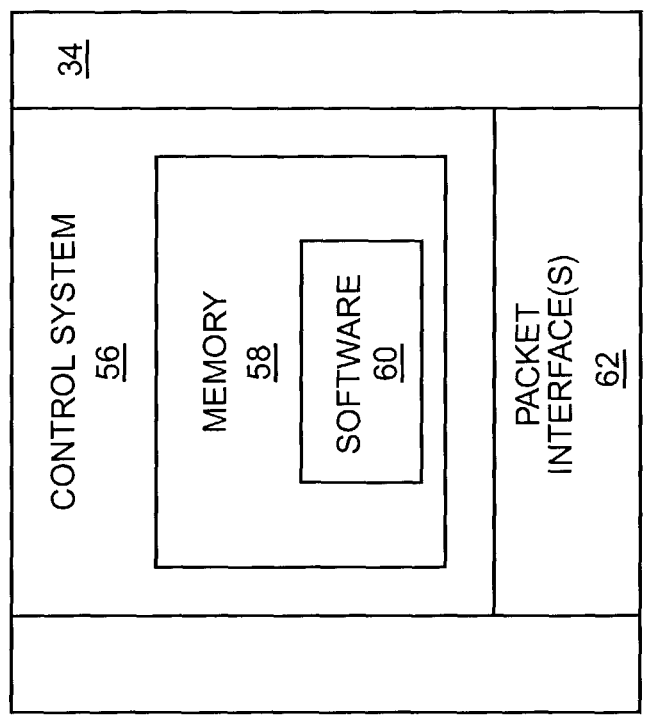
FIG. 4 is a block representation of a service node according to one embodiment of the present invention.

FIG. 4 represents a service node 34 having a control system 56 associated with memory 58 sufficient to store the necessary software 60 and data to provide the functionality of the service node 34. The control system 56 is also associated with one or more packet interfaces 62 to facilitate communications with the telephony switch 18, the gateway 20, and the terminal adapter 22, as necessary. In general, the service node 34 is provisioned to directly or indirectly communicate with the telephony switch 18 to receive messages indicative of events happening at the telephony switch 18 and provide instructions for processing or otherwise routing both incoming and outgoing calls to and from the customer premise 14. Similarly, the service node 34 may be configured to communicate with the gateway 20 to assist in establishing both incoming and outgoing calls to the terminal adapter 22 via the data network 16, the associated data access network 30, and data access CPE 32.

Like the terminal adapter 22, the service node 34 is capable of being configured in a variety of ways. Thus, defined rule sets may be provided for processing incoming calls based on the status of the telephony line, as well as the available bandwidth for the broadband access via the data network 16. For incoming calls, the service node 34 can instruct the telephony switch 18 to route the call via the telephony line or the data network 16 based on whether the telephony line is busy as described above, and if the call is routed via the data network 16, take the necessary steps to instruct the gateway 20 to facilitate a circuit-switched connection with the telephony switch 18 and bi-directional packet sessions with the terminal adapter 22. The service node 34 may be configured to route calls via the telephony line or broadband access based on the identification of the caller, time of day, or any other indicia capable of being determined by the service node and provisioned by the service provider or the subscriber.

For outgoing calls, the service node 34 doesn't necessarily have to provide much processing when the outgoing calls are routed via the telephony line. However, when the outgoing calls are routed via the data network 16, the service node 34 will again cooperate with the gateway 20 and the telephony switch 18 to establish the circuit-switched connection between the gateway 20 and the telephony switch 18, as well as instruct the telephony switch 18 how to route the call through to PSTN 12. In such a case, the service node 34 may insert caller identification directory number information, as well as any other necessary information, to allow normal PSTN routing via the telephony switch 18. Further, the service node 34 may cooperate with the terminal adapter 22 via the data network 16 to instruct the terminal adapter 22, as well as receive instructions from the terminal adapter 22. Similarly, various status information or other data can be transmitted between the service node 34 and the terminal adapter 22 to enhance communication functionality. The configuration of the service node 34 for each terminal adapter 22 and associated telephony terminals 24 can be done by the network operator or by the users of terminal adapter 22 using various techniques, including a web interface via the Internet (not shown) or via the local LAN 28.

Those skilled in the art will recognize improvements and modifications to the preferred embodiments of the present invention. All such improvements and modifications are considered within the scope of the concepts disclosed herein and the claims that follow.

What is claimed is:

1. A method for routing calls to a terminal adapter supporting a plurality of telephony terminals via a telephony line or through a packet network, the method comprising:
   receiving, at a telephony switch, an incoming call intended for one of the telephony terminals;
   establishing, via the telephony switch, the incoming call with the terminal adapter via the telephony line when a first condition is present;
   establishing, via the telephony switch, the incoming call intended for one of the telephony terminals through the packet network when a second condition is present, wherein the terminal adapter will establish a connection with one of the telephony terminals to complete the incoming call;
   providing instructions to the telephony switch to route the incoming call based on the first and second conditions, the instructions provided via a service node associated with the telephony switch and a gateway, which couples the telephony switch to the packet network; and
   providing instructions to the gateway to assist in establishing incoming calls through the packet network when the second condition exists, the instructions provided via a service node.

2. The method of claim 1 wherein the first condition is the telephony line not being busy.

3. The method of claim 2 wherein the second condition is the telephony line being busy.

4. The method of claim 1 wherein when a first incoming call is established with the terminal adapter via the telephony line, further comprising establishing subsequent incoming calls through the packet network while the first incoming call is in progress.

5. The method of claim 4 wherein the plurality of telephony terminals is associated with a common directory number.

6. The method of claim 1 wherein the plurality of telephony terminals is associated with different directory numbers and one of the first or second conditions is the incoming call being directed to at least one of the different directory numbers.

7. The method of claim 1 wherein one of the first or second conditions is the incoming call being originated from a defined caller.

8. The method of claim 1 further comprising establishing outgoing calls from the terminal adapter via the packet network.

9. The method of claim 8 further comprising routing the outgoing calls through a public switched telephone network.

10. The method of claim 9 further comprising providing routing information to enable routing the outgoing calls through the public switched telephone network.

11. The method of claim 1 wherein establishing the incoming call through the packet network further comprises routing the incoming call to a gateway, which is coupled to the packet network supporting the terminal adapter.

12. A system for routing calls to a terminal adapter supporting a plurality of telephony terminals via a telephony line or through a packet network, the system comprising:
   a telephony switch adapted to:
      receive an incoming call intended for one of the telephony terminals;
      establish the incoming call with the terminal adapter via the telephony line when a first condition is present; and establish the incoming call intended for one of the telephony terminals through the packet network when a second condition is present, wherein the terminal adapter will establish a connection with one of the telephony terminals to complete the incoming call; and a service node associated with the telephony switch and a gateway, which couples the telephony switch to the packet network, the service node adapted to:

a) provide instructions to the telephony switch to route the incoming call based on the first and second conditions; and b) provide instructions to the gateway to assist in establishing incoming calls through the packet network when the second condition exists.

13. The system of claim 12 wherein the first condition is the telephony line not being busy.

14. The system of claim 13 wherein the second condition is the telephony line being busy.

15. The system of claim 12 wherein when a first incoming call is established with the terminal adapter via the telephony line, the telephony switch is further adapted to establish subsequent incoming calls through the packet network while the first incoming call is in progress.

16. The system of claim 15 wherein the plurality of telephony terminals is associated with a common directory number.

17. The system of claim 12 wherein the plurality of telephony terminals is associated with different directory numbers and one of the first or second conditions is the incoming call being directed to at least one of the different directory numbers.

18. The system of claim 12 wherein one of the first or second conditions is the incoming call being originated from a defined caller.

19. The system of claim 12 wherein the telephony switch is further adapted to establish outgoing calls from the terminal adapter via the packet network.

20. The system of claim 19 wherein the telephony switch is further adapted to route the outgoing calls through a public switched telephone network.

21. The system of claim 20 further comprising a service node associated with the telephony switch and adapted to provide routing information to enable routing the outgoing calls through the public switched telephone network.

22. The system of claim 12 wherein the telephony switch is adapted to establish the incoming call through the packet network by routing the incoming call to a gateway, which is coupled to the packet network supporting the terminal adapter.

23. A method for routing calls to a terminal adapter supporting a plurality of telephony terminals via a telephony line or through a packet network, the method comprising:

receiving, at a telephony switch, an incoming call intended for one of the telephony terminals;

connecting, via the telephony switch, the incoming call with the terminal adapter via the telephony line when a first condition is present; and connecting, via the telephony switch, the incoming call intended for one of the telephony terminals through the packet network when a second condition is present, wherein the terminal adapter will establish a connection with one of the telephony terminals to complete the incoming call, wherein when the first condition is present, the connection is through a telephony network, the telephone switch, and the terminal adapter to one of the telephony terminals, and wherein when the second condition is present, the connection comprises a first connection between the telephony switch and a telephony network, a second connection between the telephony switch and a gateway which couples the telephony switch to the packet network, and bidirectional voice over packet sessions between the gateway and the terminal adapter.

24. The method of claim 23 wherein the first condition is the telephony line not being busy.

25. The method of claim 24 wherein the second condition is the telephony line being busy.

26. The method of claim 23 wherein when a first incoming call is established with the terminal adapter via the telephony line, further comprising establishing subsequent incoming calls through the packet network while the first incoming call is in progress.

27. The method of claim 26 wherein the plurality of telephony terminals is associated with a common directory number.

28. The method of claim 23 wherein the plurality of telephony terminals is associated with different directory numbers and one of the first or second conditions is the incoming call being directed to at least one of the different directory numbers.

29. The method of claim 23 wherein one of the first or second conditions is the incoming call being originated from a defined caller.

30. The method of claim 23 further comprising establishing outgoing calls from the terminal adapter via the packet network.

31. The method of claim 30 further comprising routing the outgoing calls through a public switched telephone network.

32. The method of claim 31 further comprising providing routing information to enable routing the outgoing calls through the public switched telephone network.

33. A system for routing calls to a terminal adapter supporting a plurality of telephony terminals via a telephony line or through a packet network, the system comprising a telephony switch adapted to:

a) receive an incoming call intended for one of the telephony terminals;

b) establish the incoming call with the terminal adapter via the telephony line when a first condition is present; and c) establish the incoming call intended for one of the telephony terminals through the packet network when a second condition is present, wherein the terminal adapter will establish a connection with one of the telephony terminals to complete the incoming call, wherein when the first condition is present, the connection is through the telephony line, the telephone switch, and the terminal adapter to one of the telephony terminals, and wherein when the second condition is present, the connection comprises a first connection between the telephony switch and a telephony network, a second connection between the telephony switch and a gateway which couples the telephony switch to the packet network, and bidirectional voice over packet sessions between the gateway and the terminal adapter.

34. The system of claim 33 wherein the first condition is the telephony line not being busy.

35. The system of claim 34 wherein the second condition is the telephony line being busy.

36. The system of claim 33 wherein when a first incoming call is established with the terminal adapter via the telephony line, the telephony switch is further adapted to establish subsequent incoming calls through the packet network while the first incoming call is in progress.

37. The system of claim 36 wherein the plurality of telephony terminals is associated with a common directory number.

38. The system of claim 33 wherein the plurality of telephony terminals is associated with different directory numbers and one of the first or second conditions is the incoming call being directed to at least one of the different directory numbers.

39. The system of claim 33 wherein one of the first or second conditions is the incoming call being originated from a defined caller.

40. The system of claim 33 wherein the telephony switch is further adapted to establish outgoing calls from the terminal adapter via the packet network.

41. The system of claim 40 wherein the telephony switch is further adapted to route the outgoing calls through a public switched telephone network.

42. The system of claim 41 further comprising a service node associated with the telephony switch and adapted to provide routing information to enable routing the outgoing calls through the public switched telephone network.

* * * * *